United States Patent
Hauser et al.

(10) Patent No.: US 9,756,788 B1
(45) Date of Patent: *Sep. 12, 2017

(54) SYSTEMS AND METHODS FOR COOLING A CONTROLLER ASSEMBLY

(71) Applicant: Hydro-Gear Limited Partnership, Sullivan, IL (US)

(72) Inventors: Raymond Hauser, Sullivan, IL (US); Bruce E. Reid, Sullivan, IL (US); Donald Rousser, Sullivan, IL (US); Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 232 days.

This patent is subject to a terminal disclaimer.

(21) Appl. No.: 14/622,340

(22) Filed: Feb. 13, 2015

Related U.S. Application Data

(60) Continuation of application No. 13/487,946, filed on Jun. 4, 2012, now Pat. No. 8,955,296, which is a division of application No. 12/825,122, filed on Jun. 28, 2010, now Pat. No. 8,191,343.

(60) Provisional application No. 61/220,907, filed on Jun. 26, 2009.

(51) Int. Cl.
*A01D 69/00* (2006.01)
*A01D 42/00* (2006.01)
*A01D 34/64* (2006.01)
*A01D 34/81* (2006.01)

(52) U.S. Cl.
CPC .............. *A01D 42/00* (2013.01); *A01D 34/64* (2013.01); *A01D 34/81* (2013.01)

(58) Field of Classification Search
CPC .......... A01D 42/00; A01D 34/64; A01D 34/81
USPC .......... 180/68.1, 68.6; 296/180.1, 180.5, 91; 56/1, 11.9, 12.8, 16.8, 17.5, 320.1
See application file for complete search history.

(56) References Cited

U.S. PATENT DOCUMENTS

| | | |
|---|---|---|
| 788,560 A | 5/1905 | Smith, Jr. et al. |
| 2,496,022 A | 1/1950 | Remonte |
| 2,791,078 A | 5/1957 | Kiekhaefer |
| 3,044,239 A | 7/1962 | Harkness |
| 3,091,906 A | 6/1963 | Hall |
| 3,452,523 A | 7/1969 | Ernst |
| 3,521,434 A | 7/1970 | Heinz |

(Continued)

FOREIGN PATENT DOCUMENTS

| | | | |
|---|---|---|---|
| DE | 3232895 | 3/1984 | |
| DE | 3232895 A1 * | 3/1984 | ............. A01D 34/78 |

(Continued)

*Primary Examiner* — Thomas B Will
*Assistant Examiner* — Joan D Misa
(74) *Attorney, Agent, or Firm* — Neal, Gerber & Eisenberg LLP

(57) ABSTRACT

Apparatus and methods for cooling controller assemblies for electric utility vehicles are disclosed. Auxiliary implements powered by electric motors onboard a utility vehicle create airflow that is captured and directed to provide increased ambient airflow across heat sinks used to dissipate heat from heat generating components. Airflow across heated surfaces is further created by vehicle movement and vacuum pressure. Fins and other heat dissipating architecture are employed. Features of the cooling systems enable increased controller assembly functionality and/or decreased controller assembly package size.

19 Claims, 10 Drawing Sheets

(56) References Cited

U.S. PATENT DOCUMENTS

| | | | |
|---|---|---|---|
| 4,087,955 A | 5/1978 | Szymanis | |
| 4,308,713 A | 1/1982 | James | |
| 4,318,268 A | 3/1982 | Szymanis | |
| 4,407,112 A | 10/1983 | Shepherd et al. | |
| 4,442,658 A | 4/1984 | Cartner | |
| 4,507,909 A | 4/1985 | Kelpin, Sr. | |
| 4,527,380 A | 7/1985 | Fushiya et al. | |
| 4,944,142 A | 7/1990 | Sueshige et al. | |
| 5,007,234 A | 4/1991 | Shurman et al. | |
| 5,063,476 A | 11/1991 | Hamadah et al. | |
| 5,370,178 A | 12/1994 | Agonafer et al. | |
| 5,381,314 A | 1/1995 | Rudy, Jr. et al. | |
| 5,442,901 A | 8/1995 | Niemela et al. | |
| 5,510,958 A | 4/1996 | Shimabara et al. | |
| 5,631,821 A | 5/1997 | Muso | |
| 5,640,046 A | 6/1997 | Suzuki et al. | |
| 5,802,745 A | 9/1998 | Haseotes et al. | |
| 5,894,987 A | 4/1999 | Layne et al. | |
| 5,911,897 A | 6/1999 | Hamilton | |
| 6,338,013 B1 | 1/2002 | Ruffner | |
| 6,377,462 B1 | 4/2002 | Hajicek et al. | |
| 6,417,577 B1 | 7/2002 | Grewe et al. | |
| 6,504,720 B2 | 1/2003 | Furuya | |
| 6,666,008 B2 | 12/2003 | Iida et al. | |
| 6,826,895 B2 | 12/2004 | Iida et al. | |
| 7,211,912 B2 | 5/2007 | Takenaka et al. | |
| 7,336,495 B2 | 2/2008 | Maeda | |
| 7,540,132 B2 | 6/2009 | Shimada et al. | |
| 7,565,943 B2 | 7/2009 | Herrmann et al. | |
| 7,610,975 B1 | 11/2009 | Gust et al. | |
| 7,688,582 B2 | 3/2010 | Fukazu et al. | |
| 7,690,176 B2 | 4/2010 | Shinn | |
| 7,797,791 B2 | 9/2010 | White et al. | |
| 7,884,560 B2 | 2/2011 | Lucas et al. | |
| 8,127,876 B2 | 3/2012 | Phillips | |
| 8,207,693 B2 | 6/2012 | Hauser et al. | |
| 8,240,414 B2 | 8/2012 | Sasahara et al. | |
| 2004/0083701 A1 | 5/2004 | Brower | |
| 2007/0039302 A1 | 2/2007 | Velke et al. | |
| 2007/0294991 A1 | 12/2007 | Medina et al. | |
| 2008/0086997 A1 | 4/2008 | Lucas et al. | |
| 2008/0099262 A1 | 5/2008 | Phillips | |
| 2008/0100238 A1 | 5/2008 | Shaw | |
| 2008/0121443 A1 | 5/2008 | Clark et al. | |
| 2008/0135313 A1 | 6/2008 | Onderko et al. | |
| 2008/0234096 A1 | 9/2008 | Joshi et al. | |
| 2009/0000839 A1 | 1/2009 | Ishii et al. | |
| 2009/0065273 A1 | 3/2009 | Wyatt et al. | |
| 2009/0201650 A1 | 8/2009 | Hauser et al. | |

FOREIGN PATENT DOCUMENTS

| | | | | |
|---|---|---|---|---|
| GB | 2083733 | | 3/1982 | |
| GB | 2083733 A | * | 3/1982 | ............. A01D 34/81 |
| WO | WO 8202520 | | 8/1982 | |
| WO | WO 0200458 | | 1/2002 | |

* cited by examiner

SYSTEMS AND METHODS FOR COOLING A CONTROLLER ASSEMBLY

CROSS REFERENCE

This application is a continuation of U.S. patent application Ser. No. 13/487,946 which was filed Jun. 4, 2012, which is a divisional of U.S. patent application Ser. No. 12/825,122 filed Jun. 28, 2010, which claims the benefit of U.S. Provisional Patent Application No. 61/220,907 filed on Jun. 26, 2009. All of these prior applications are incorporated by reference herein in their entirety.

TECHNICAL FIELD

This disclosure is generally related to utility vehicles, such as lawn and garden tractors and mowers, and more particularly to systems and methods for cooling controller assemblies used to control electric motors associated with such vehicles.

BACKGROUND OF THE INVENTION

Utility vehicles, such as, for example, lawn and garden tractors and mowers, have traditionally relied upon internal combustion engines as the prime mover transferring power through mechanical linkages. However, electric drive utility vehicles have emerged as viable alternatives to internal combustion utility vehicles, particularly due to rising oil and fuel prices. Such vehicles employ electric power supplies to provide power through controller assemblies to one or more electric motors that may be used to propel the vehicles and/or power auxiliary equipment, such as a cutting blade on a lawn tractor. These controller assemblies not only act as energy conduits, but also incorporate logic to analyze various inputs and determine various outputs. All of these functions generate heat, which must be dissipated to prevent damage to controller assembly components. With the advancement of electric drive utility vehicles and their functionality, demands on controller assemblies continue to increase. As the controller assemblies handle more input and generate more output, they also generate more heat, which presents problems in the area of temperature control.

One solution to these problems is to increase the size of the controller assembly. A larger controller assembly has a larger heat-absorbing housing to act as a heat sink. In addition, a larger controller assembly provides more space for separating the various internal heat-generating components needed to provide the increasing levels of functionality. However, increasing the size of the controller assembly also increases material costs and consumes more vehicle package space. Thus, the challenge is to maximize heat dissipation while maintaining a minimally sized, compact controller assembly design. This disclosure is directed to addressing this challenge, as well as others, in the general area of controller assembly package and design.

SUMMARY OF THE INVENTION

The present invention comprises systems and methods for cooling electronic control systems and controller assemblies used to control electric motors that propel a vehicle and/or perform auxiliary functions, such as to turn mower blades. Various embodiments are disclosed to illustrate how airflow created through use of auxiliary devices and/or movement of the vehicle may be harnessed to improve dissipation of heat generated by a controller assembly. In addition, some embodiments efficiently place structural heat sinks designed to absorb and conduct heat away from concentrated heat generation points within the controller assembly, such as MOSFET transistors. The cooling systems and methods described herein allow existing controller assemblies to take on more functionality without increasing in size. Alternatively, the systems and methods may be utilized to reduce the size of existing controller assemblies while maintaining present levels of functionality without concerns of overheating, thus saving material cost and package space on utility vehicles.

A better understanding of the objects, advantages, features, properties and relationships of the invention will be obtained from the following detailed description and accompanying drawings which set forth one or more illustrative embodiments which are indicative of the various ways in which the principles of the invention may be employed.

DETAILED DESCRIPTION OF THE DRAWINGS

Figure 1:
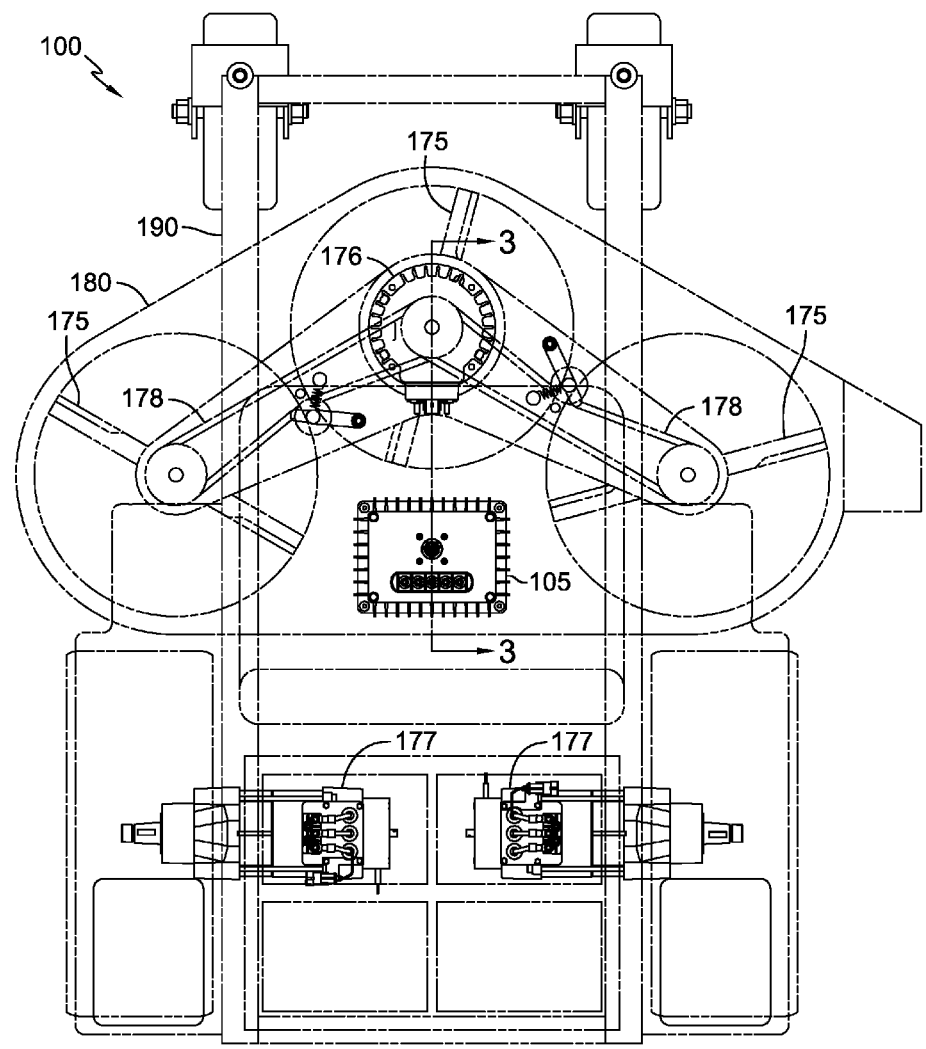
FIG. 1 is a top plan view of a utility vehicle employing a system for cooling a controller assembly according to a first embodiment of the present invention.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art.

Figure 2:
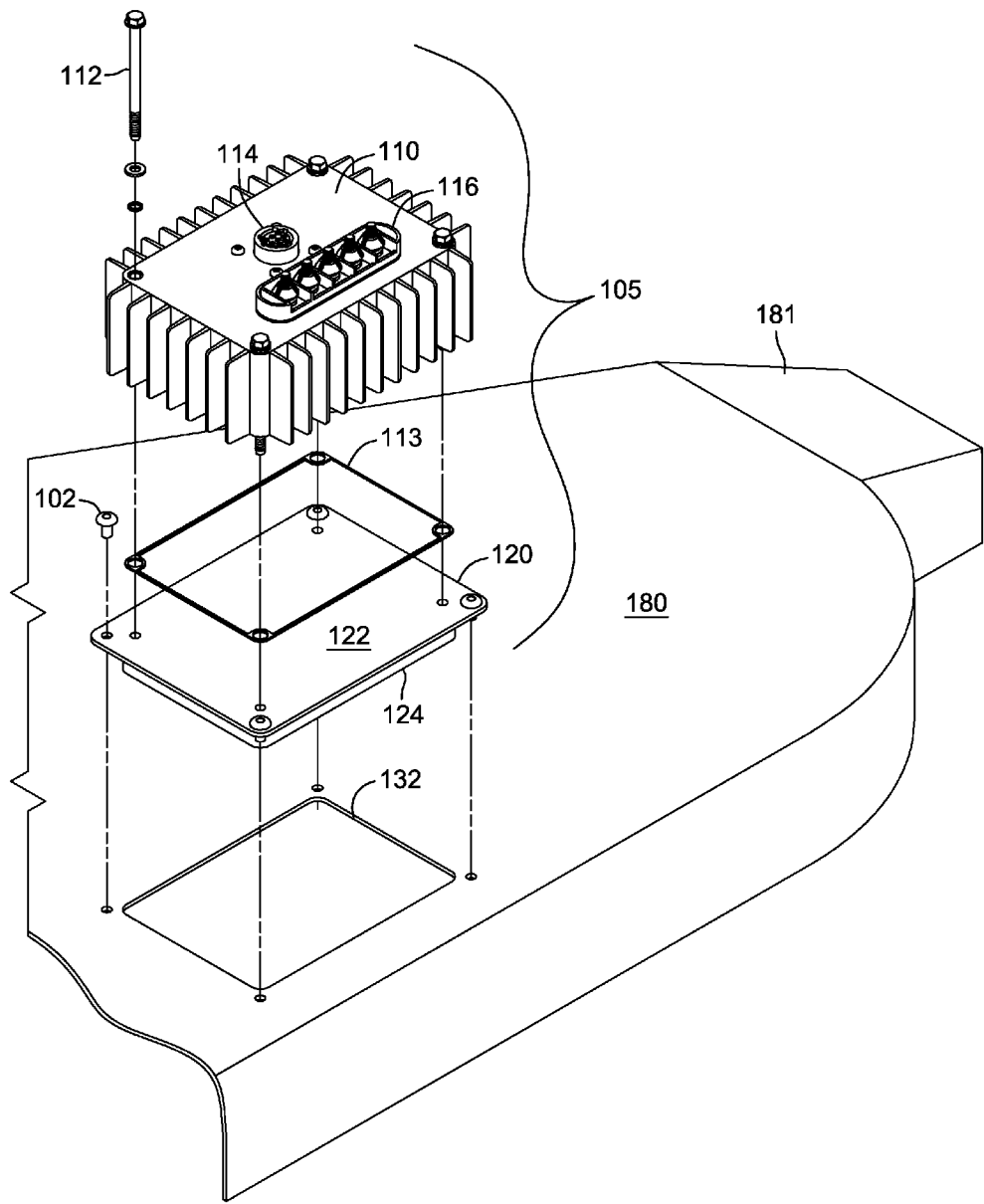
FIG. 2 is an exploded perspective view showing certain components of the first embodiment.
Figure 3:
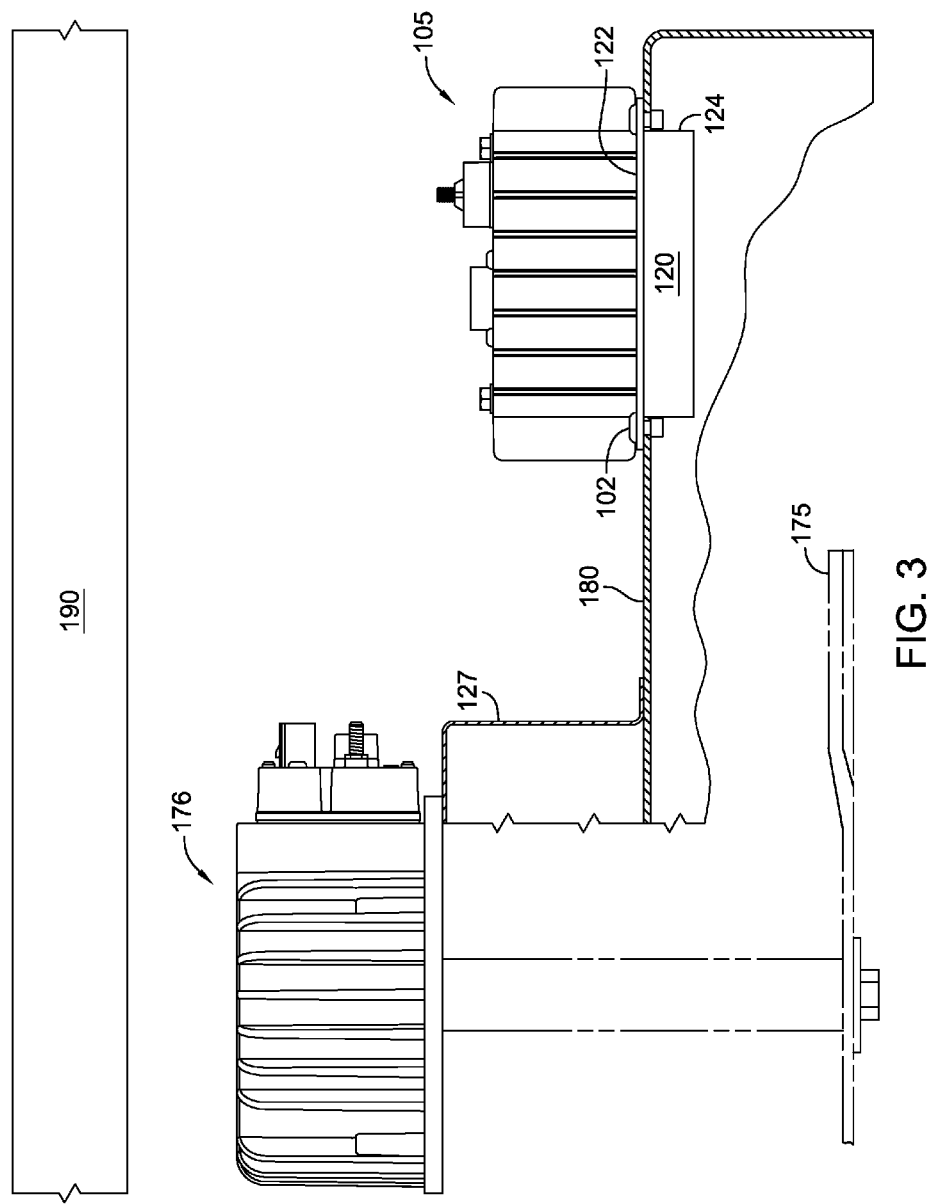
FIG. 3 is a partially sectioned view along the line 3-3 of FIG. 1.

FIGS. 1-3 illustrate a first embodiment of the present invention, which comprises a controller assembly 105 designed and mounted in a manner so as to expose its heat conducting exterior to air currents generated by an auxiliary implement. While this embodiment is illustrated in association with a lawn tractor, it will be understood that the invention could be adapted to work with other auxiliary equipment, wherein operation of the equipment generates an airflow. The auxiliary equipment will have at least one primary work function, such as trimming grass, digging a hole, or brushing off a sidewalk, however performance of that primary work function will have the secondary effect of generating an airflow.

FIG. 1 shows a top view of a utility vehicle 100, in this case a lawn tractor having three rotating blades 175 suspended from a mowing deck 180. The mowing deck 180 is, in turn, suspended from the frame 190 of utility vehicle 100 by a set of chains or linkages (not shown). The blades 175 are rotated, either directly as in the case of the center blade or through a belt and pulley system 178 as in the case of the left and right blades, by an electric auxiliary motor 176. The electric auxiliary motor 176 is controlled by controller assembly 105, which is located in the illustrated embodiment at approximately the center of vehicle 100. FIG. 1 also displays two electric drive motors 177, each for driving separate right and left wheels of utility vehicle 100. For clarity, motors used to propel the vehicle are referred to herein as drive motors and motors for powering utility equipment, such as mowing blades 175, are referred to herein as auxiliary motors. Utility vehicles may incorporate a single controller assembly to power both drive and auxiliary motors, may have separate controller assemblies for powering the drive motors and the auxiliary motors, or may even have separate controller assemblies for each of the individual motors on the utility vehicle. Information regarding the internal construction of the controller assemblies, their various embodiments, and explanations as to how they receive input and drive their associated electric motors is disclosed in more detail in U.S. patent application Ser. Nos. 12/209,120 and 12/367,144, the terms of which are incorporated herein by reference in their entirety.

As seen in FIG. 2, controller assembly 105 comprises a controller housing 110 having a plurality of outwardly extending fins for increasing conductive surface area, and a thermal conducting base plate 120, which also may be referred to herein as the "heat sink." The controller housing 110 and base plate 120 join to form a seal, with the aid of a sealing gasket 113, to protect the internal components of controller assembly 105. On its top surface, controller housing 110 provides a water-tight circular connector 114 for receiving a wiring harness (not shown) used to supply control inputs to and feedback from controller assembly 105. The housing 110 also provides a terminal block 116 having five terminals—three for driving the 3-phase auxiliary motor 176 and two for creating a circuit for receiving power from an onboard power supply (not shown). The controller housing 110 also provides four bolt housings for receiving mounting bolts 112 used to secure it to base plate 120. The size and shape of the controller housing, the quantity and placement of its fins, and the location, size and type of its connector and terminal block will vary across different embodiments. For example, alternative controller housings that might be substituted for controller housing 110 are illustrated in U.S. patent application Ser. No. 12/367,144.

In the illustrated embodiment, base plate 120 is a solid component having a flat upper surface 122 for mating to controller housing 110 and a downwardly extending member 124 which fits through a cutaway 132 provided in mowing deck 180. This is further illustrated in FIG. 3, where controller assembly 105 is shown in assembly position. As shown, the flat upper surface 122 extends beyond deck cutaway 132, providing a flange for mating controller assembly 105 to mowing deck 180. This may be done using a set of rivets 102 as shown; however any known fasteners sufficient to maintain a rigid connection may be used. The controller assembly 105 may be positioned anywhere on the upper surface of mowing deck 180, but is preferably at a point at or near the central left-to-right axis of vehicle 100 such as shown in FIG. 1 so as to maintain overall deck weight distribution. Additionally, placing controller assembly 105 aft of rotating blades 175 and associated auxiliary motor 176 provides for increased protection from objects the vehicle 100 may encounter in its path. As shown in FIG. 3, controller assembly 105 is also vertically separated from auxiliary motor 176, which is mounted atop belt drive housing 127. This further separation is beneficial because auxiliary motor 176 is an additional source of heat.

The base plate 120 functions as the primary heat sink for controller assembly 105, and thus is preferably formed from a good heat conductive material such as aluminum. By extending base plate 120 through deck cutaway 132, the primary heat sink of controller assembly 105 is exposed to the rapid airflow present under mowing deck 180. This rapid airflow, caused in the illustrated embodiment by rotation of rotating blades 175, cycles across heat sink 120 helping to convectively cool controller assembly 105. As blades 175 rotate, warm air having circulated across base plate extension 124 exits out of discharge chute 181. This discharge and the turbulence caused by the blade rotation creates a low pressure condition under the mowing deck 180, which in turn causes fresh cooler air to be pulled in from under its edges. Thus, operation of rotating blades 175 draws a continuous flow of ambient air under mowing deck 180, around its underside (and thus across base plate extension 124), and out discharge chute 181. The thicker the base plate extension 124, the better it will serve as a heat sink. However, increased thickness adds weight and material cost to vehicle 100 and may also reduce ground clearance. Thus, the thickness of the base plate extension 124 may vary and is determined based on the cooling requirements and cost, weight and package constraints of a particular utility vehicle 100.

Deck mounting, as provided in this embodiment, inevitably exposes controller assembly 105 to a harsher environment than in cases where a controller assembly is mounted upon or suspended from vehicle frame 190. Though certain precautions may be taken such as centralized placement as discussed above, it may be necessary to provide isolation so as to absorb impact shocks and vibrations common to mowing decks in some environments. This could be done, for instance, by placing grommets in the joints used to secure controller assembly 105 to mowing deck 180. In addition, connector 114 and terminal block 116 should be of a proper specification to endure increased levels of moisture and debris.

While the embodiment illustrated in FIGS. 1-3 displays controller assembly 105 in connection with a series of rotating blades 175, application to other auxiliary devices that create airflow is contemplated. For instance, an auxiliary motor 176 used to drive a blower creates a vacuum into which fresh air is pulled. That air could be directed across a controller assembly base plate in similar fashion as discussed above. Other auxiliary equipment that involves rotating components such as a tiller or spreader might also create airflows that could be similarly utilized for cooling purposes.

Figure 4:
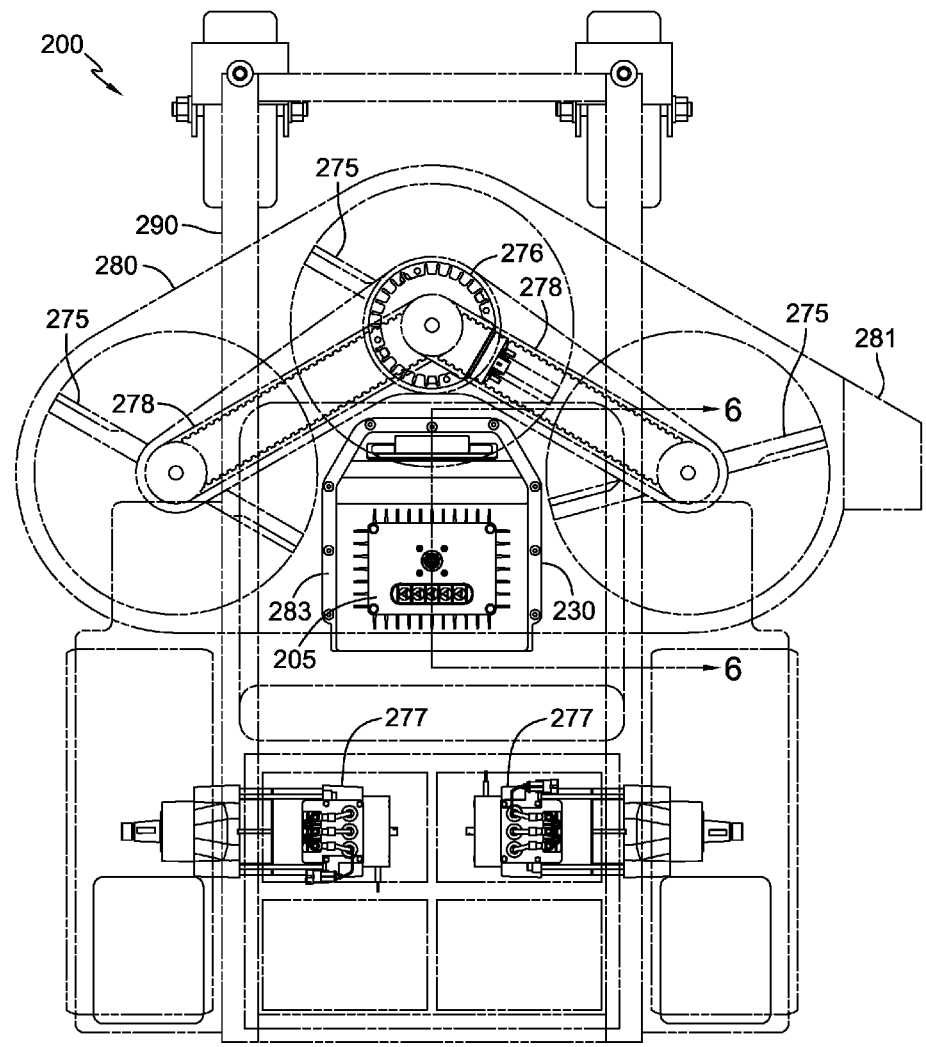
FIG. 4 is a top plan view of a utility vehicle employing a system for cooling a controller assembly according to a second embodiment of the present invention.
Figure 5:
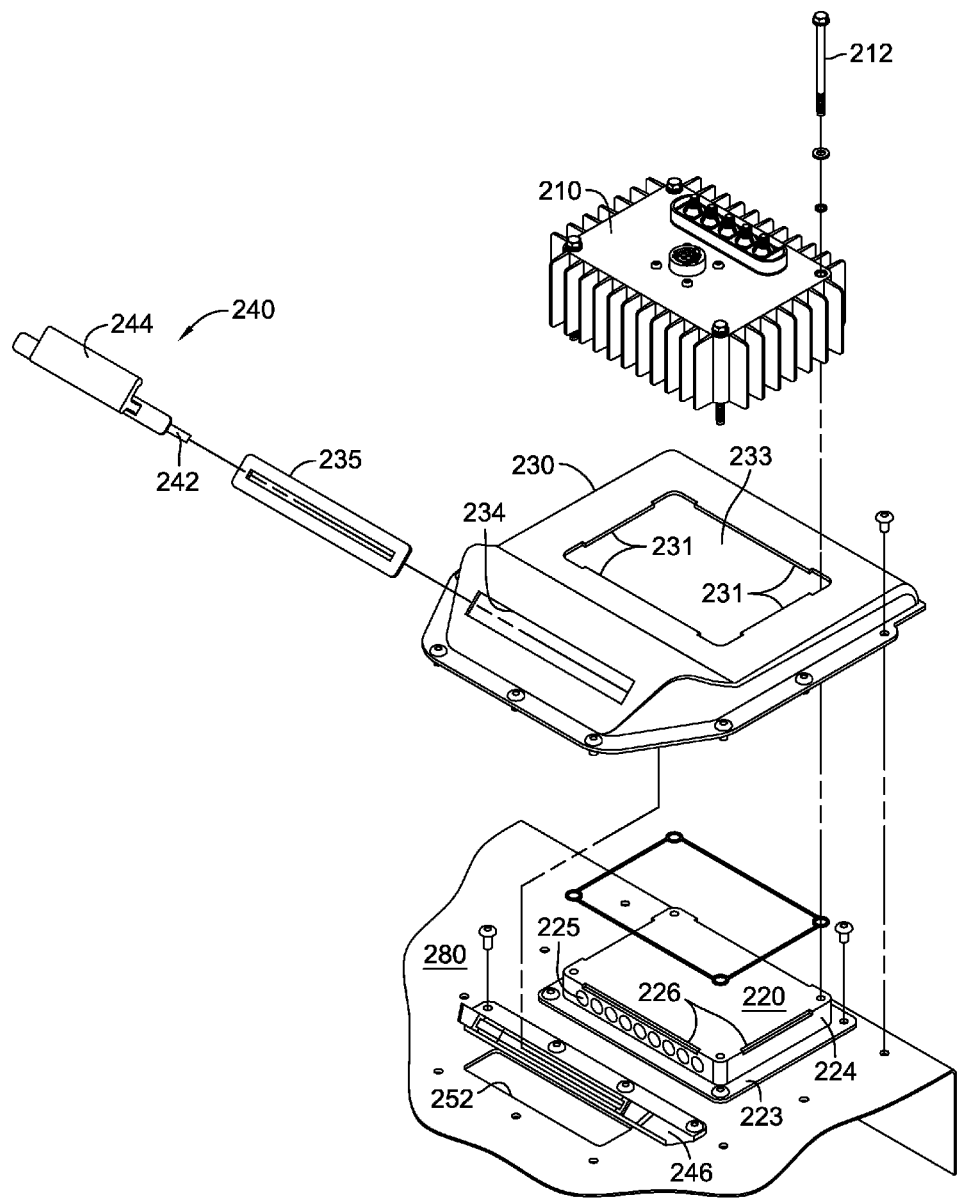
FIG. 5 is an exploded perspective view showing certain components of the second embodiment.
Figure 6:
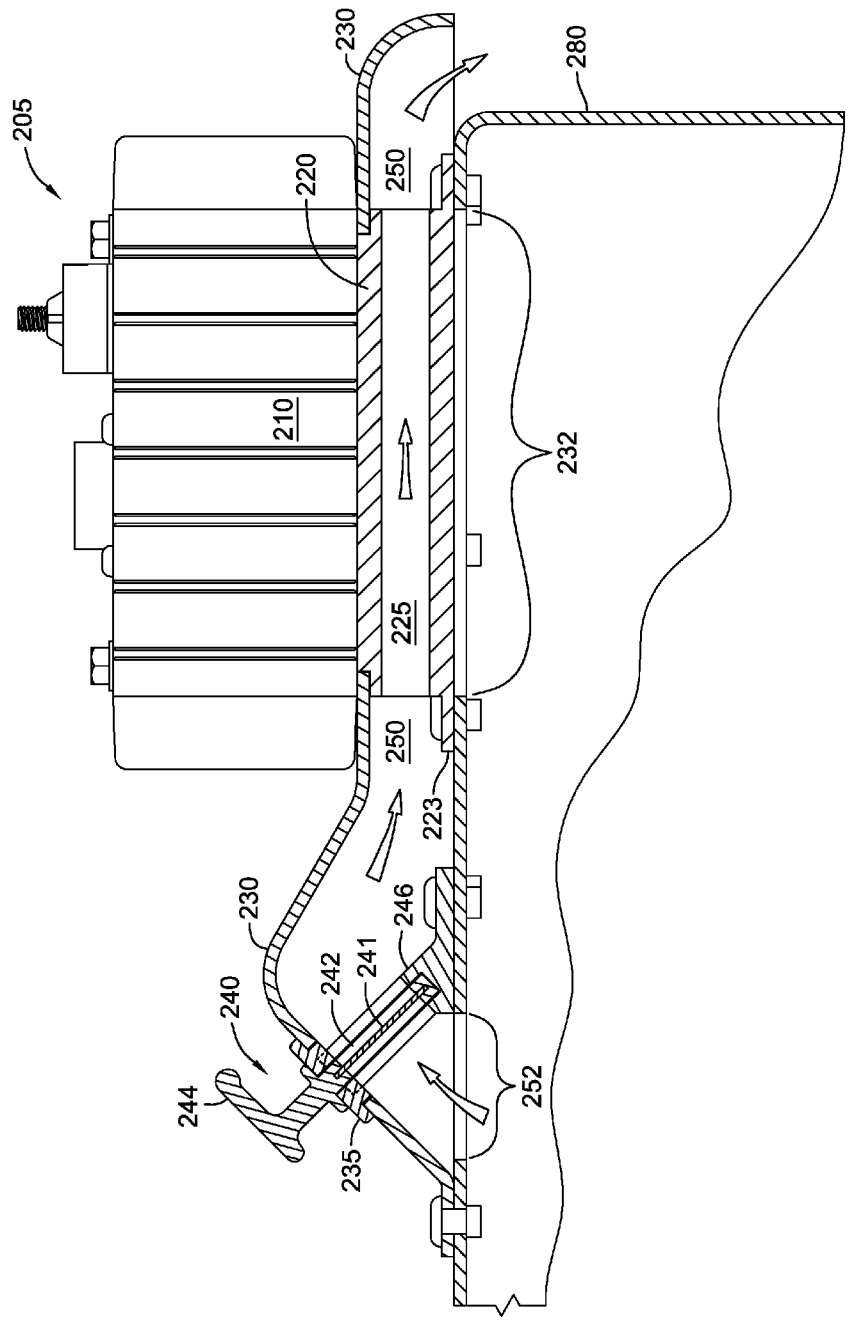
FIG. 6 is a partially sectioned view along the line 6-6 of FIG. 4.

FIGS. 4-7 illustrate a second embodiment of the present invention. This embodiment incorporates a duct 230 which attaches to mowing deck 280 so as to create a channel 250 for directing air toward and across or through controller assembly 205 of utility vehicle 200. Though similar to controller assembly 105 of FIGS. 1-3, controller assembly 205 includes a base plate 220 that has been inverted such that its extending member 224 protrudes upward into channel 250 created by duct 230 instead of down through cutaway 232 in mowing deck 280. In fact, deck cutaway 232, which can be seen in FIG. 6, is not essential for use with controller assembly 205. In some embodiments, there may be no cutaway in the deck under the base plate. While having such a cutaway increases the base plate's surface area exposed to ambient air, mowing deck 280 is ideally metallic and can also transfer heat through to the ambient air below. Alternatively, where a deck cutaway 232 is present, it could be utilized by a base plate extending in both directions, such that a first portion extends upward into channel 250 and a second portion extends through deck cutaway 232, thereby combining concepts from the first and second embodiments.

In any case, base plate 220 provides a flange 223 used to secure controller assembly 205 to mowing deck 280, and specifically controller housing 210 is secured to extending member 224 of base plate 220. This may be done, as shown in FIG. 5, with a series of mounting bolts 212 which insert into threaded housings in base plate 220, or by any known fastening means capable of providing a rigid connection and environmental seal. In this case, controller housing 210 of the second embodiment is identical to controller housing 110 of the first embodiment. However, other housing configurations could be substituted as explained in association with the first embodiment.

As shown in FIGS. 5 and 6, base plate 220 also provides a series of air passages 225. Though these air passages 225 may be of any number and may take on any shape, ideally they lend to base plate manufacturability, maximize surface contact between base plate 220 and the ambient air passing through it, and minimize constriction of air through the channel 250 formed by the duct 230. The base plate 220 shown may be formed using a variety of techniques such as casting, extruding or drilling. Material removed from such a process may be recycled to offset any additional processing steps required to create the air passages 225. It will be understood with reference to FIG. 4 that the air passages 225 do not provide the only path for air travelling through channel 250. As duct 230 is wider than controller assembly 205, air traveling through channel 250 may also travel around controller assembly 205. Accordingly, an alternative embodiment might utilize a base plate with no internal passages (such as air passages 225) as a means to save cost. However, this would reduce airflow rate and surface contact with the base plate, resulting in less efficient cooling.

FIG. 4 shows a top view of duct 230, which attaches to mowing deck 280 just aft of auxiliary motor 276 and extends rearward past the entire controller assembly 205 and off the back edge of mowing deck 280. A mating flange 283 is formed along all but this trailing edge of duct 230 for mating to mowing deck 280. mating flange 283 may be fastened to mowing deck 280 by any conventional means, but is shown affixed with a series of rivets. Ideally duct 230 is formed with a series of pre-formed holes in mating flange 283 to facilitate its location on mowing deck 280. As duct 230 primarily serves to direct air, it is ideally constructed of an easily formable, lightweight and inexpensive material such as plastic; however any reasonable solid material could be supplemented.

As seen in FIG. 5, duct 230 provides a cutaway 233 in which controller assembly 205 is disposed. The perimeter of cutaway 233 includes tabs 231 which fit into grooves 226 formed in base plate 220. The grooves 226 are ideally somewhat oversized to allow for component manufacturing variability. The duct 230 is thus further located and held in place by controller assembly 205 when controller housing 210 is mated to base plate 220 as shown in FIG. 6. Not only does this help locate and secure duct 230, it helps to prevent air passing through channel 250 from escaping around the edges of controller assembly 205. It should be noted that the connection between duct 230 and controller assembly 205 need not be air tight. Some air bleed from channel 250 may occur without compromising the function of the system. This embodiment prevents controller housing 210 from being fixed to base plate 220 prior to the point of final assembly wherein duct 230 is mounted to mowing deck 280. However, controller housing 210 may be independently removed for service at any time.

FIG. 6 displays a partially sectioned side view of this embodiment showing channel 250 created by duct 230. As indicated by the arrows, air enters channel 250 through a channel entrance opening 252, which is located in the top of mowing deck 280 just aft of the leading edge of duct 230. As discussed in accordance with the first embodiment, rotation of rotating blades 275 excites the air under mowing deck 280, creating a low pressure area which, combined with blade angle and orientation, tends to pull fresh air up from under the edges of mowing deck 280. The blades 275 then cause the air to rotate around mowing deck 280 and exit through discharge chute 281. The channel entrance opening 252 provides an additional exit for the turbulent air. Airflow through the channel entrance opening 252 could be substantially increased by closing off discharge chute 281, such as often done in mulching operations.

After the air enters channel 250, it passes through a screen assembly 240 which filters out grass or other solid objects. The airflow then proceeds through or around base plate 220, and finally exits off the back of mowing deck 280. Thus, duct 230 combines with the upper surface of mowing deck 280 to create channel 250 so as to direct a constant flow of pressurized air toward the primary heat sink (i.e., base plate 220) of controller assembly 205 to further increase heat dissipation through air convection during operation of rotating blades 275.

To increase air intake into channel 250, other embodiments may provide a forward-facing air scoop (not shown) for collecting additional airflow based on the forward motion of utility vehicle 200. Such a scoop could either be a separate component suspended from the underside of the mowing deck, or may be formed in the mowing deck itself, for instance by extending the mowing deck surface forming the rear edge of channel entrance opening 252 down and raising the mowing deck surface forming the leading edge of the channel entrance opening 252 up. This would have the effect of causing the channel entrance opening 252 in FIG. 6 to appear tilted clockwise rather than flat as shown.

Figure 7:
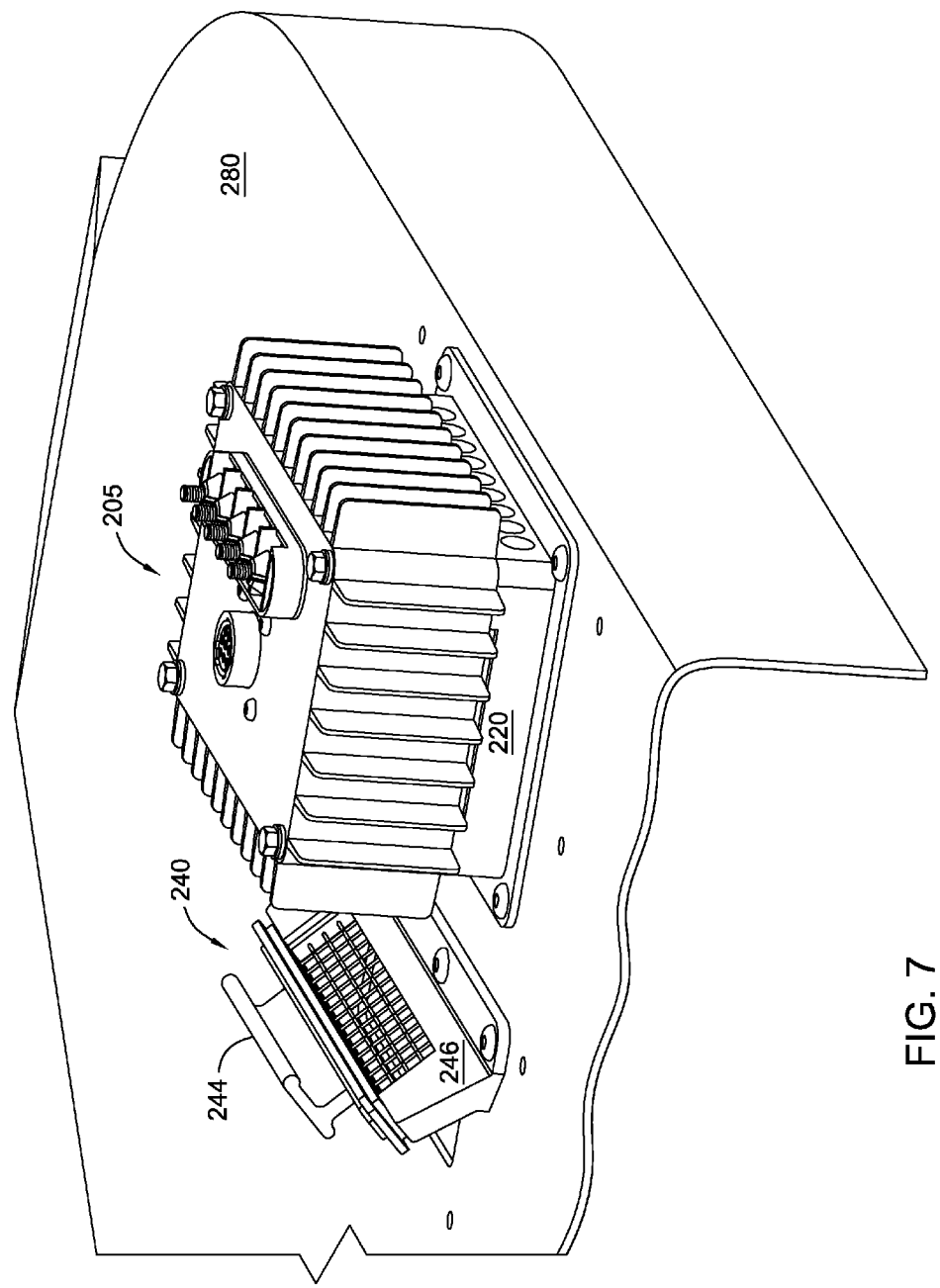
FIG. 7 is a perspective view of the second embodiment with certain components removed for clarity.

FIG. 7 illustrates a perspective view of controller assembly 205 and screen assembly 240 referred to above, but with duct 230 removed for illustration purposes. Screen assembly 240 includes a screen 241 having a plastic perimeter casing 242 and a handle 244 which is used to install and remove screen assembly 240 from a screen receptacle 246 fixed to mowing deck 280. The screen 241 is perforated so as to allow air to pass through while stopping larger objects that might damage controller assembly 205 or block channel 250. Ideally, screen 241 is a wire mesh with sufficient strength to resist damage from impact with small stones or other debris that may be propelled against it. The mesh should be fine enough to stop harmful debris, but coarse enough to avoid constricting airflow through channel 250. The screen receptacle 246, which locates screen assembly 240 and holds it in position, is shaped to match the inside contour of duct 230 such that, when assembled, air is prevented from passing around it. Screen receptacle 246, which serves to direct all airflow through screen 241, is ideally formed of a rigid plastic and provides an attachment flange for connection to mowing deck 280. Receptacle 246 may be secured to mowing deck 280 using any variety of means, but is attached with four rivets as shown.

The screen receptacle 246 positions screen 241 such that it is angled downward. This allows gravity to assist in clearing grass and other debris that may become pressed against it by the airflow. Nevertheless, screen assembly 240 will require occasional cleaning—especially when working in moist environments. To facilitate this, handle 244 is provided to pull it out of screen receptacle 246 so that it may be wiped clean and replaced. To accommodate insertion and removal of screen assembly 240, duct 230 provides a screen slot 234 which aligns with screen receptacle 246. The slot is covered by a clip-in fascia 235 which further locates and secures screen assembly 240. The screen casing 242 may be equipped with a tapered leading edge (not shown) so as to assist in assembly and reinsertion after cleaning.

To allow for easy cleaning or clearing of screen 241, screen receptacle 246 may provide a stiff downward-facing edge (not shown) at its entry point that abuts the screen and scrapes against it as the screen is removed. This scraping action will clear the screen in most cases. The fascia 235 or duct 230 may also encompass a locking tab (not shown) to prevent the complete removal of screen assembly 240 from screen receptacle 246 unless the tab is depressed. In such a manner, screen 241 might be cleaned by an operator through a simple up and down pump of handle 244. High end models might employ a wiping mechanism (not shown) that automatically clears screen 241 when a lack of airflow is detected in channel 250. Airflow could be measured by a variety of known means such as placement of a Pitot tube within channel 250 beyond the screen. The Pitot tube (not shown) could be snap-fit into a hole in duct 230 and electrically connected to the wiping mechanism.

Figure 8:
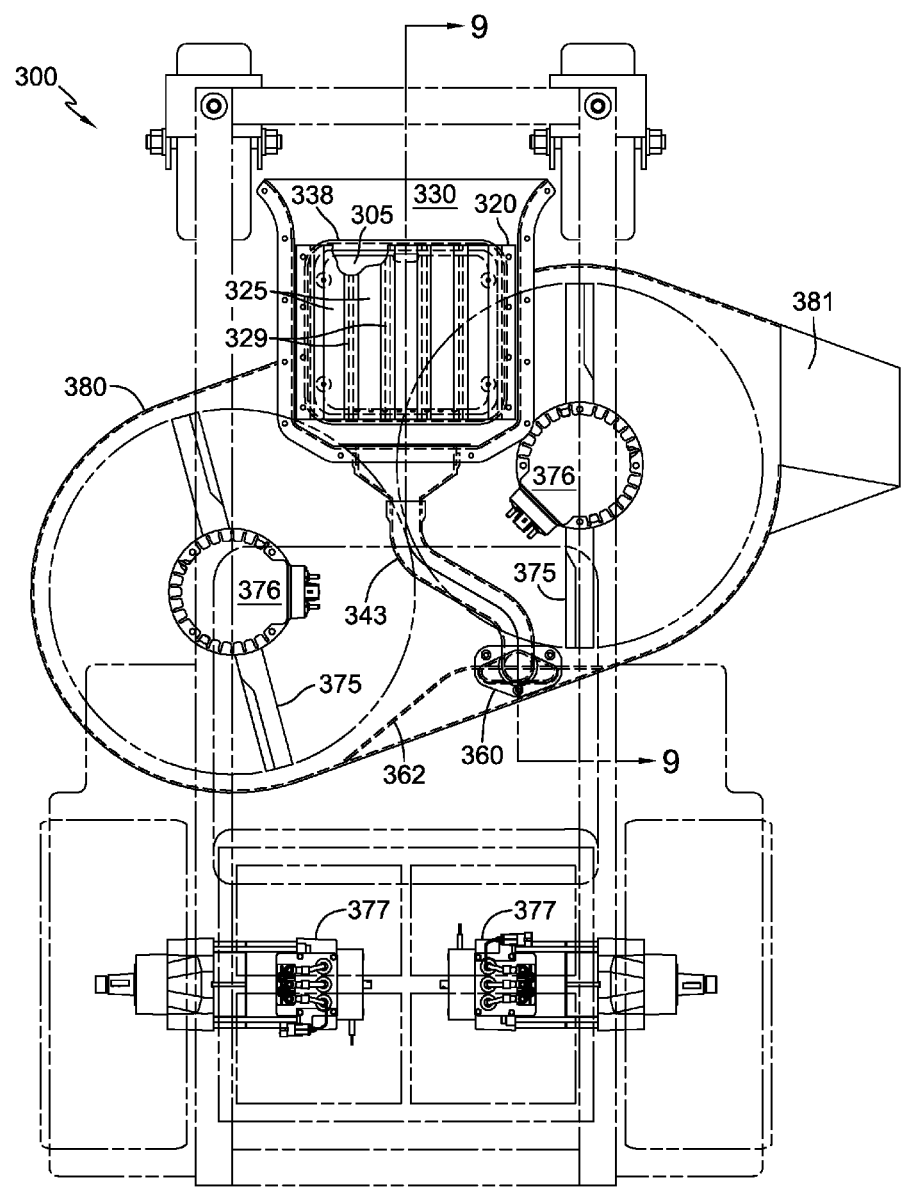
FIG. 8 is a top plan view of a utility vehicle employing a system for cooling a controller assembly according to a third embodiment of the present invention.
Figure 9:
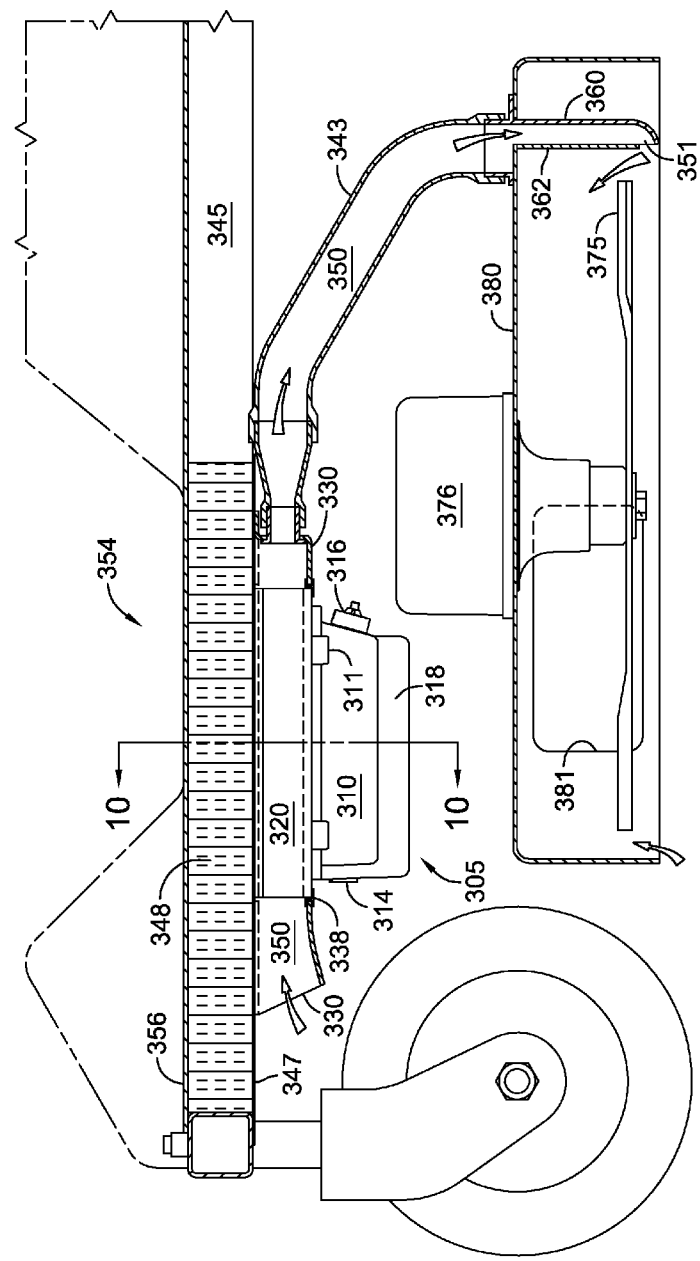
FIG. 9 is a partially sectioned view along the line 9-9 of FIG. 8.
Figure 10:
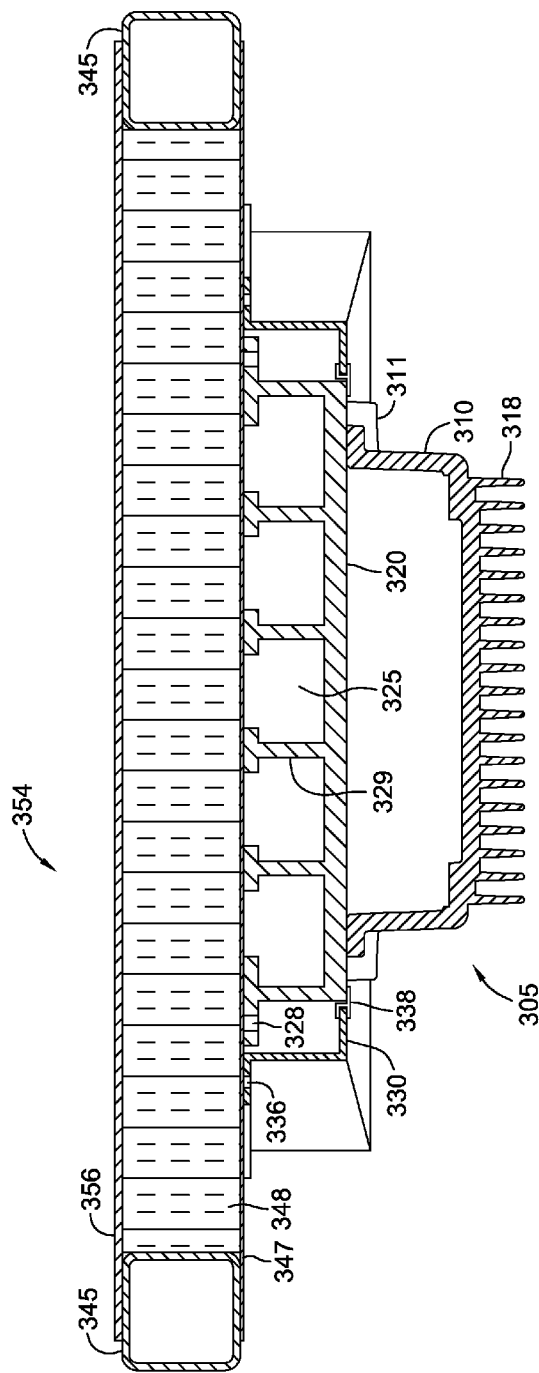
FIG. 10 is a partially sectioned view along the line 10-10 of FIG. 9.

As it may be desirable for an operator to completely remove a deck assembly or auxiliary implement housing for certain utility vehicle functions, controller assemblies directly mounted to such assemblies or housings, such as those described in the previous embodiments, are limited to powering the auxiliary motors associated therewith. Obviously the drive motor(s) of the utility vehicle must still be powered in the absence of such an assembly or housing in order to propel the vehicle. Thus, in the above embodiments, a separate controller assembly (not shown), mounted to the frame of the utility vehicle itself, may be used. FIGS. 8-10 show a third embodiment which includes concepts used in the second embodiment, such as a duct connected to an auxiliary housing so as to create a channel, but applies them to a frame-mounted controller assembly 305. Because controller assembly 305 is mounted to vehicle frame 354, it could potentially control both auxiliary motors 376 and drive motors 377. Obviously controlling more motors generates more heat, thus the need for increased heat dissipation.

The utility vehicle 300 of FIG. 8 has a mowing deck 380 with two rotating blades 375, each directly powered by separate auxiliary motors 376. Controller assembly 305 is suspended from vehicle frame 354 forward of auxiliary motors 376, and centered from left to right across vehicle 300. FIG. 9 demonstrates a side view of mowing deck 380, controller assembly 305 and one of the auxiliary motors 376 (the other electric motor 376, slightly aft and offset from the one shown, has been removed for clarity). Finally, FIG. 10 shows a section view of controller assembly 305 and vehicle frame 354 from the rear of vehicle 300.

As is quickly apparent with reference to these figures, controller assembly 305 of this embodiment has been modified from those of the previously described embodiments. In addition to its reversed orientation, fins 318 have been relocated so as to extend downward from controller assembly 305 and run in line with the air movement caused by forward motion of vehicle 300. As a result, connector 314 and terminal block 316 have been relocated on different sides of controller housing 310. The air passages 225 of base plate 220 have been replaced by air passages 325, which are separated by ribs 329 in base plate 320. The ribs 329 are not closed in, but rather open on the side extending away from controller assembly 305. Again, the base plate 320 is ideally formed of aluminum, using known manufacturing means such as extrusion. The controller housing 310 provides four mounting bosses 311 for receiving mounting bolts (not shown) to secure it to threaded receptacles in base plate 320, though additional fasteners may be used as needed to provide a rigid, sealed connection between the components.

As best shown in FIG. 10, vehicle frame 354 consists of a floor plate 356 and frame rails 345, both of which are typically steel to provide sufficient structure to vehicle 300. As floor plate 356 is directly exposed to sunlight, it can often get quite hot. Thus, ideally controller assembly 305 is not mounted directly to floor plate 356 or frame rails 345, which receive heat from floor plate 356 through conduction. Instead, an aluminum skin 347, coated in structural tape (not shown) fixes to the bottom of frame rails 345 and extends across a portion of vehicle 300 providing a cooler mounting surface for controller assembly 305. The base plate 320 is then attached to aluminum skin 347 by inserting any of several known fasteners such as rivets through a plurality of mounting holes 328 along the sides of base plate 320. A layer of insulation 348 fills the gap between aluminum skin 347 and floor plate 356 so as to insulate controller assembly 305 from solar heat gain. To improve stiffness of aluminum skin 347 for mounting purposes, it may also be pre-glued to insulation 348. Though this mounting configuration serves to protect controller assembly 305 from additional heat from floor plate 356, other mounting methods could be used, such as with metal brackets connected directly to the floor plate.

Much like in the previous embodiment, duct 330 extends across base plate 320, thereby forming a channel 350 to direct air toward and around or through it. The duct 330 provides a flange along its sides and rear for mounting to aluminum skin 347 through a plurality of duct mounting holes 336, such as with self-tapping screws which would allow for easy removal of duct 330 as needed. Instead of fitting into a base plate groove, duct 330 is attached to the sides and rear of base plate 320 using a perimeter seal 338. In this manner, the entire duct 330 can be removed from vehicle 300 without detaching any portion of controller assembly 305. Removal of duct 330 may be desired in cases where utility vehicle 300 is to be operated without mowing deck 380, as explained further below. The perimeter seal 338 serves to reduce the amount of air that would otherwise escape from channel 350 around controller assembly 305. In alternative embodiments, the duct may extend over entire controller assembly 305 to include controller housing 310. This may bring more air across controller housing 310, but complicates connection of the wiring harnesses to connector 314 and terminal block 316, and might have the adverse effect of stifling the air around controller assembly 310 in periods when utility vehicle 300 is operating but not moving forward.

As shown in FIG. 9, the forward end of duct 330 opens across its entire width to form a scoop for collecting air into channel 350 as vehicle 300 moves forward. Once collected, air is guided around the outside of base plate 320 or through one of its air passages 325. As the air moves rearward, duct 330 comes together to form a relatively narrow exhaust port through which air is directed. Connected to the exhaust port of duct 330 is a flexible hose 343 having two ends. The first end of hose 343 is clamped over the exhaust port of duct 330 while the second end is clamped over the receiving end of a vacuum attachment 360, which is in turn affixed to deck 380 and/or an interior wall 362 along the rear of mowing deck 380. The flexible hose 343 is ideally formed of rubber. It must be durable enough to subsist in the harsh environment below vehicle frame 354, but flexible enough to allow for relative movement that will occur between mowing deck 380 and frame 354. Such movement is inevitable and, though no connection means are shown in FIG. 9, chains or other linkages are used to suspend mowing deck 380 in a manner so as to allow such movement.

The vacuum attachment 360 referred to above operates to direct airflow much like duct 330. Ideally, it is a molded plastic component having a flange for mating to interior wall 362 of mowing deck 380, such as with a plurality of rivets. In alternative embodiments, vacuum attachment 360 could be mounted directly to the rear of mowing deck 380, alleviating the need for interior wall 362. However, it is better protected when mounted to interior wall 362 as shown in FIGS. 8 and 9. In addition, interior wall 362 is formed so as to place passage exit opening 351 low to the ground and close to blade 375 to improve the suction of air through channel 350. As mentioned above, the rotation of blades 375 functions to create a low pressure zone which draws air up from under mowing deck 380, where it is then rotated by blades 375 and expelled through a discharge chute 381. By placing the exit point of channel 350 at the bottom of mowing deck 380 below rotating blade 375, the blade action will tend to pull air through the exit of channel 350, extending the low pressure zone into channel 350. Thus, it will be understood that the embodiment illustrated in FIGS. 8-10 is intended to not only ram air into the scoop at the opening of duct 330, but also to draw air through channel 350 from its exit at the exit point of vacuum attachment 360.

By increasing the flow rate and volume of ambient air across controller assembly 305 through forced entry of air at the entrance of duct 330 and suction of air through vacuum connection 360 at the exit of channel 350, duct 330, hose 343 and vacuum attachment 360 work together to accelerate convection cooling of controller assembly 305. While the specific geometries of duct 330, hose 343, vacuum attachment 360 and interior wall 362 may vary, it is important that they join to form airtight connections so as to improve the conditions for vacuum suction through channel 350.

The rate and volume of airflow through channel 350 may be further increased, as needed, through use of one or more optional fans mounted in a variety of locations along channel 350. A fan mounted forward of controller assembly 305 would serve to blow air directly toward and around or through base plate 320, thus improving the ram air function of the scoop. However, such a fan would have limited use for drawing air into channel 350 as duct 330 is relatively wide at that point. Alternatively, a fan mounted aft of the controller where duct 330 narrows would serve to draw air into the passage in a pump-like fashion. However it would be unable to send air toward base plate 320 from this position. Maximum fan usage would thus incorporate fans both fore and aft of base plate 320 so as to improve both ram and suction functions of the design.

Though the one or more fans could continuously operate, ideally they would be operated as needed by the very controller assembly 305 they are provided to cool. Each controller assembly 305 is typically equipped with a sensor to assess its own internal temperature. As this temperature climbs above a pre-designated point, controller assembly 305 could direct the fan(s) to switch on so as to increase airflow across controller assembly 305. Once the internal temperature is sufficiently reduced, controller assembly 305 would direct the fan(s) to shut off. Alternatively, the operation of the fan(s) could be triggered by the ambient air temperature.

While additional cooling may, thus, be provided for a controller assembly 305 attached to vehicle frame 354 and capable of powering both auxiliary motor(s) 376 and drive motor(s) 377, it will be noted that some measure of additional cooling is reliant on the operation of auxiliary motor(s) 376 and associated auxiliary equipment (e.g., blades 375). In the illustrated embodiment, should an operator wish to detach mowing deck 380 and associated auxiliary motor(s) 376 from vehicle 300 for certain activities, the operator would have to decouple hose 343 from duct 330, thereby losing the vacuum effect of the blades. However, the air scoop and optional fan(s) could still operate to increase airflow across base plate 320 in the absence of mowing deck 380. As discussed above, however, there may be activities wherein vehicle 300 is to operate in a stationary position for long periods of time. In such cases, it may actually be most efficient to completely remove duct 320 as well.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

We claim:
1. A drive system for a utility vehicle including a pair of driven wheels, a pair of non-driven wheels, and a mowing deck disposed on a vehicle frame and having at least one cutting blade for cutting vegetation, the drive system comprising:
  a pair of electric drive motors disposed on the vehicle frame, each of the pair of electric drive motors engaged to and driving one of the pair of driven wheels;

an electric auxiliary motor disposed on the mowing deck and driving an output shaft extending through the mowing deck for driving the at least one cutting blade; and a controller for managing the pair of electric drive motors, the controller comprising a controller housing mounted on a first side of the mowing deck, and a thermal conducting base plate connected to the controller housing and extending through the mowing deck to a second side of the mowing deck, wherein the at least one cutting blade is located on the second side of the mowing deck and the at least one cutting blade generates an airflow that comes into contact with the thermal conducting base plate.

2. The drive system of claim 1, wherein the controller is located at a position on the mowing deck where the at least one cutting blade does not pass directly beneath the controller.

3. The drive system of claim 1, wherein the at least one cutting blade comprises three cutting blades and the controller is located at a position on the mowing deck where none of the three cutting blades pass directly beneath the controller.

4. The drive system of claim 1, wherein the controller is disposed at a first height with respect to the at least one cutting blade and the electric auxiliary motor is disposed at a second height, different from the first height, with respect to the at least one cutting blade.

5. The drive system of claim 4, wherein the second height is greater than the first height.

6. The drive system of claim 1, wherein the controller comprises a gasket disposed between the controller housing and the base plate to form a seal there between, and wherein the base plate comprises a member forming a heat sink and extending downwardly from a generally planar surface on the base plate.

7. A utility vehicle comprising:
a frame;
a pair of driven wheels disposed on the frame;
a mowing deck disposed on the frame and having a top surface and a bottom surface;
an electric auxiliary motor disposed adjacent to the top surface of the mowing deck and having an output shaft extending through to the bottom surface of the mowing deck;
at least one cutting blade engaged to and driven by the output shaft, wherein the at least one cutting blade is disposed below the bottom surface of the mowing deck;
a pair of electric drive motors disposed on the frame, each electric drive motor being engaged to and driving one of the pair of driven wheels, and each of the pair of electric drive motors being engaged to and electrically controlled by a controller disposed on the mowing deck, wherein the controller comprises a controller housing disposed above the top surface of the mowing deck, and a heat sink connected to the controller housing, wherein the heat sink extends through a cutaway in the mowing deck to the bottom surface so as to come into contact with an airflow generated by the at least one cutting blade.

8. The utility vehicle of claim 7, wherein the at least one cutting blade comprises a plurality of cutting blades connected to the output shaft by a belt and pulley system.

9. The utility vehicle of claim 7, wherein the controller comprises a gasket disposed between the controller housing and a base plate to form a seal there between, and wherein the heat sink comprises a member extending downwardly from the base plate.

10. The utility vehicle of claim 7, wherein the controller is disposed at a first height with respect to the at least one cutting blade and the electric auxiliary motor is disposed at a second height, different from the first height, with respect to the at least one cutting blade.

11. The utility vehicle of claim 10, wherein the second height is greater than the first height.

12. The utility vehicle of claim 11, wherein the controller is located at a position on the mowing deck where the at least one cutting blade does not pass directly beneath the controller.

13. The utility vehicle of claim 12, wherein the at least one cutting blade comprises three cutting blades and the controller is located at a position on the mowing deck where none of the three cutting blades pass directly beneath the controller.

14. A utility vehicle comprising:
a mowing deck disposed on a vehicle frame, the mowing deck having a first side and a second side, opposite to the first side, and at least one cutting blade disposed below the second side;
a pair of electric drive motors disposed on the vehicle frame, each drive motor being engaged to and driving one of a pair of driven wheels; and
an electric auxiliary motor disposed adjacent to the first side of the mowing deck and having an output shaft extending through to the second side of the mowing deck and driving the at least one cutting blade, wherein the electric auxiliary motor is engaged to and electrically controlled by a controller disposed on the first side of the mowing deck, and wherein the controller comprises a heat sink that extends through a cutaway in the mowing deck to the second side so as to come into contact with an airflow generated on the second side by the at least one cutting blade.

15. The utility vehicle of claim 14, wherein the at least one cutting blade comprises a plurality of cutting blades connected to the output shaft by a belt and pulley system.

16. The utility vehicle of claim 15, wherein the controller comprises a gasket disposed between a controller housing and a base plate to form a seal there between, and wherein the heat sink comprises a member extending downwardly from the base plate.

17. The utility vehicle of claim 15, wherein the controller is disposed at a first height with respect to the at least one cutting blade and the electric auxiliary motor is disposed at a second height, greater than the first height, with respect to the plurality of cutting blades.

18. The utility vehicle of claim 14, wherein the at least one cutting blade comprises three cutting blades and the controller is located at a position on the mowing deck where none of the three cutting blades pass directly beneath the controller.

19. The utility vehicle of claim 14, wherein the controller is located at a position on the mowing deck where the at least one cutting blade does not pass directly beneath the controller.

* * * * *